(12) United States Patent
Fokine et al.

(10) Patent No.: US 7,121,790 B2
(45) Date of Patent: Oct. 17, 2006

(54) GAS TURBINE ARRANGEMENT

(75) Inventors: Arkadi Fokine, Moscow (RU); Anatoli Kwasnikov, Moscow (RU); Igor Ossipov, Moscow (RU); Christoph Pfeiffer, Waldshut-Tiengen (DE); Joerg Stengele, Ruetihof (CH); Sergey Trifonov, Moscow (RU)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/865,844

(22) Filed: Jun. 14, 2004

(65) Prior Publication Data
US 2005/0118016 A1    Jun. 2, 2005

Related U.S. Application Data

(63) Continuation of application No. PCT/CH02/00662, filed on Dec. 4, 2002.

(30) Foreign Application Priority Data
Dec. 11, 2001    (RU) .............................. 2001133771
Apr. 12, 2002    (WO) ..................... PCT/CH02/00662

(51) Int. Cl.
*F04D 29/08*    (2006.01)
(52) U.S. Cl. ................. 415/173.7; 415/174.2
(58) Field of Classification Search ............ 415/173.7, 415/174.2, 173.6, 173.3, 173.1
See application file for complete search history.

(56) References Cited

U.S. PATENT DOCUMENTS

| | | | |
|---|---|---|---|
| 3,807,891 A | 4/1974 | McDow et al. | |
| 3,995,971 A | 12/1976 | White | |
| 4,023,252 A * | 5/1977 | Levinstein et al. | 428/650 |
| 4,199,151 A | 4/1980 | Bartos | |
| 4,384,822 A | 5/1983 | Schweikl et al. | |
| 4,512,712 A | 4/1985 | Baran, Jr. | |
| 4,752,184 A | 6/1988 | Liang | |
| 4,792,277 A | 12/1988 | Dittberner, Jr. et al. | |
| 4,863,343 A | 9/1989 | Smed | |
| 4,869,640 A | 9/1989 | Schwarz et al. | |
| 4,902,198 A | 2/1990 | North | |
| 4,930,980 A | 6/1990 | North et al. | |
| 5,145,316 A | 9/1992 | Birch | |
| 5,158,430 A | 10/1992 | Dixon et al. | |
| 5,238,364 A | 8/1993 | Kreitmeier | |

(Continued)

FOREIGN PATENT DOCUMENTS

DE    196 09 690 A1    10/1997

(Continued)

OTHER PUBLICATIONS

Search Report from PCT/CH02/00662 (Feb. 18, 2003).

(Continued)

*Primary Examiner*—Edward K. Look
*Assistant Examiner*—Dwayne J White
(74) *Attorney, Agent, or Firm*—Adam J. Cermak; Cermak & Kenealy, LLP

(57) ABSTRACT

A gas turbine arrangement with heat accumulation segments (3) which are arranged, opposite moving blades, on a casing of the gas turbine, and with guide vanes (1) which are arranged adjacently to the heat accumulation segments (3) over the circumference between the casing of the gas turbine and the rotor, the moving blades and the guide vanes (1) being arranged in a hot-gas duct (5) of the gas turbine. At least one sealing element (4) arranged over the circumference is present between the guide vanes (1) and the heat accumulation segments (3) and can be separated from the hot-gas duct (5) by means of a protective shield (6).

9 Claims, 2 Drawing Sheets

U.S. PATENT DOCUMENTS 5,333,995 A    8/1994   Jacobs et al.
5,380,155 A    1/1995   Varsik et al.
5,429,478 A    7/1995   Krizan et al.
6,076,835 A *  6/2000   Ress et al. .................. 277/637

FOREIGN PATENT DOCUMENTS

| | | |
|---|---|---|
| FR | 2 646 221 | 10/1990 |
| WO | 95/12004 | 5/1995 |
| WO | 00/70192 | 11/2000 |
| WO | 03/054358 A1 | 7/2003 |

OTHER PUBLICATIONS

Search Report from CH 0068/02 (Apr. 9, 2002).
IPER from PCT/CH02/00662 (Sep. 17, 2003).

* cited by examiner

GAS TURBINE ARRANGEMENT

This application is a Continuation of, and claims priority under 35 U.S.C. § 120 to, International application number PCT/CH02/00662, filed 4 Dec. 2002, and claims priority under 35 U.S.C. § 119 to Russian application number 2001 133771, filed 11 Dec. 2001, the entireties of both of which are incorporated by reference herein.

BACKGROUND OF THE INVENTION

1. Field of the Invention

The invention relates to a gas turbine arrangement with a heat protection shield and with an adjacent guide vane.

2. Brief Description of the Related Art

Numerous gas turbine arrangements are known from the prior art. U.S. Pat. Nos. 3,807,891, 3,995,971, 4,384,822, 4,512,712, 4,792,277, 4,863,343, 4,869,640, 4,902,198, 4,930,980, 5,158,430 5,238,364, 5,380,155, 5,429,478 disclose arrangements of this type.

In various arrangements, the guide vanes are connected directly to the adjacent heat accumulation segments, as disclosed, for example, in FIG. 1 of U.S. Pat. Nos. 4,384, 822, 4,863,343, and 4,930,980 or in FIG. 2 of U.S. Pat. No. 5,429,478.

Problems arise, in general, in arrangements in which a gap occurs between the guide vanes and the adjacent heat accumulation segments, said gap allowing the hot gases to penetrate and consequently making it possible for the parts involved to be damaged. This is known, for example, from FIG. 1 of U.S. Pat. No. 4,902,198.

SUMMARY OF THE INVENTION

The aim of the invention is to avoid the disadvantages mentioned. The object on which the invention is based is to provide a gas turbine arrangement, by means of which improved protection of the casing of the gas turbine between a guide vane and a heat accumulation segment against penetrating hot gases is possible.

According to the invention, the object is achieved by means of a gas turbine arrangement, in that at least one sealing element arranged over the circumference is present between the guide vanes and the heat accumulation segments.

The sealing element may advantageously have a W-shape and is arranged in the axial direction with respect to the rotor of the gas turbine between the guide vanes and the heat accumulation segments, so that a sufficient spring effect acts on the two elements.

Further, advantageously, the sealing element may be separated in relation to the hot-gas duct by means of a protective shield. This allows improved protection, and therefore a prolonged useful life of the sealing element, against the thermal effects of the hot gas while the gas turbine is in operation. Reduced temperature gradients in the sealing element additionally prevent a distortion of the seal and a possible loss of the spring effect. A contamination of the sealing element by the hot gases is likewise avoided by means of the protective shield.

Advantageously, the sealing element and the protective shield may be segmented over the circumference, so that it becomes easier to install them. They may consist, for example, of four to eight segments.

For secure mounting, the sealing element and the protective shield may be located in or on a step of the heat accumulation segment, in which case the protective shield may have an L-shape and is arranged horizontally on the step.

The sealing element and the protective shield may consist of a nickel- or cobalt-based superalloy and be coated with a metallic coating, such as, for example, MCrAlY.

BRIEF DESCRIPTION OF THE DRAWINGS

The invention is illustrated by means of the accompanying drawings in which.

Only the elements essential to the invention are illustrated. Identical elements are given the same reference symbols in the various figures.

DETAILED DESCRIPTION OF THE PREFERRED EMBODIMENTS

Figure 1:
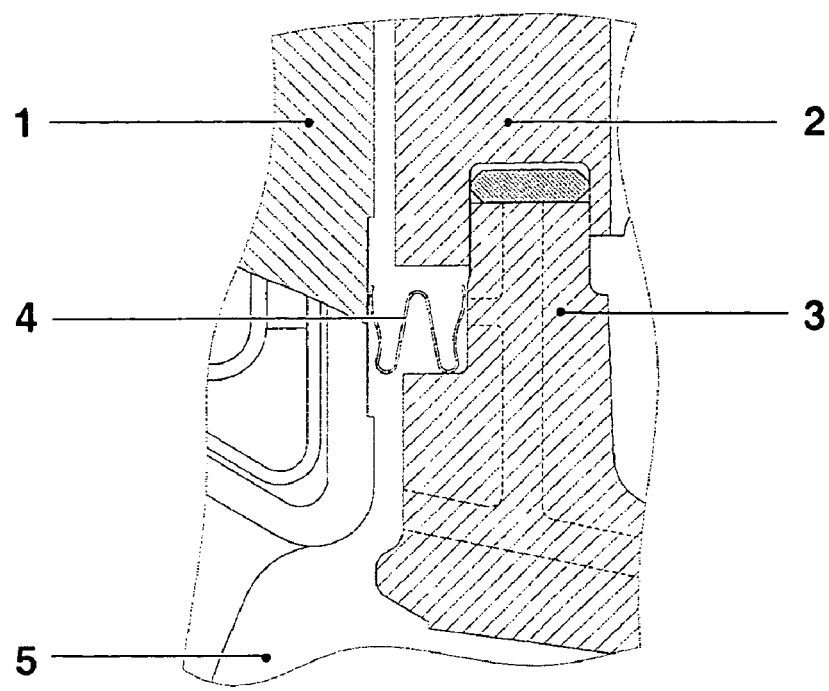
FIG. 1 shows a gas turbine arrangement with a heat accumulation segment, with an adjacent guide vane and with a sealing element between the two elements.

FIG. 1 shows a detail of a gas turbine. A heat accumulation segment 3 is arranged on a carrier 2 on a casing, not illustrated. As is known generally from the prior art, moving blades, which are arranged over the circumference on a rotor, not illustrated, are located underneath the heat accumulation segment 3. Guide vanes 1 are adjacent to the heat accumulation segment 3. Conventionally, the guide vanes 1 and the heat accumulation segments 3 are likewise arranged over the circumference of the casing. The moving blades and the guide vanes 1 are located in a hot-gas duct 5 of the gas turbine.

As is evident from FIG. 1, according to the invention, at least one sealing element 4 is present between the guide vanes 1 and the heat accumulation segments 3. Said sealing element is likewise arranged over the circumference. The sealing element 4 has a W-shape. In order to obtain a correct spring effect from the guide vane 1 and the heat accumulation segment 3, the "W" is arranged in the axial direction with respect to the rotor of the gas turbine between the guide vanes 1 and the heat accumulation segments 3.

Figure 2:
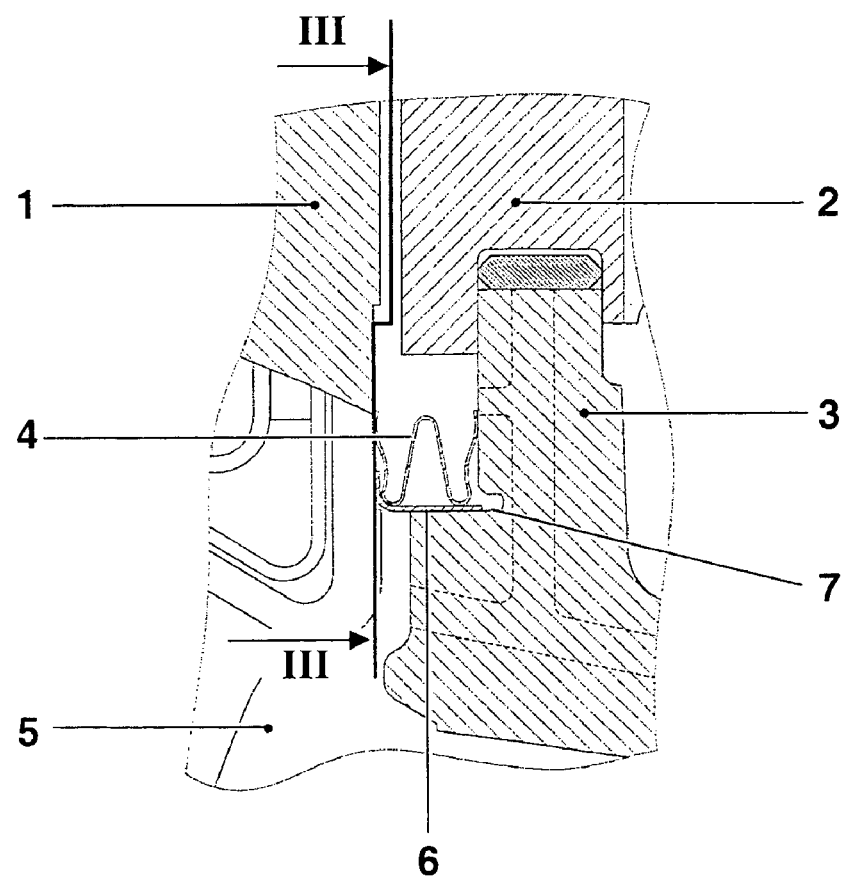
FIG. 2 shows a gas turbine arrangement with the heat accumulation segment, with an adjacent guide vane, with a sealing element between the two elements and with a protective shield for the sealing element.

As is further evident from FIG. 2, the sealing element 4 is separated in relation to the hot-gas duct 5 by means of a protective shield 6. This allows improved protection, and therefore a prolonged operational lifetime of the sealing element 4, against the thermal effects of the hot gas while the gas turbine is in operation. Reduced temperatures or temperature gradients in the sealing element 4 additionally prevent a distortion of the seal and a possible loss of the spring effect. Contamination of the sealing element 4 by the hot gases is likewise avoided.

Figure 3:
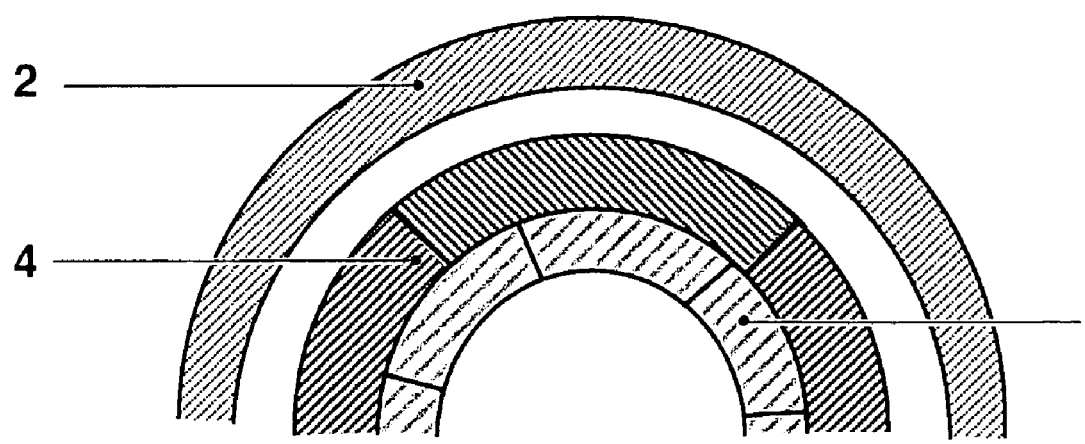
FIG. 3 shows a view according to the section III—III of FIG. 2.

As is evident from the two FIGS. 2 and 3, the sealing element 4 and the protective shield 6 are arranged in or on a step 7 which is likewise in the heat accumulation segment 3. This allows a good sealing effect and a secure arrangement of the two elements. The protective shield 6 has an L-shape and is arranged horizontally on the step 7.

It is evident from FIG. 3, which shows a section along the line III—III of FIG. 2, that both the sealing element 4 and the protective shield 6 may be segmented over the circumference, so that it becomes easier to install them. In an advantageous embodiment, the sealing element 4 and the protective shield 6 consist of four to eight segments.

The sealing element 4 and the protective shield 6 may consist of a nickel- or cobalt-based superalloy and be coated with a metallic coating, such as, for example, MCrAlY.

LIST OF REFERENCE SYMBOLS

1 Guide vane
2 Carrier
3 Heat accumulation segment
4 Sealing element
5 Hot-gas duct
6 Protective shield for sealing element 4
7 Step While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A gas turbine arrangement, comprising:
   a gas turbine casing defining a circumference;
   a gas turbine rotor defining a circumference;
   moving blades arranged over the rotor circumference;
   a carrier arranged over the casing circumference;
   a turbine hot-gas duct;
   guide vanes arranged over the circumference of the casing;
   heat accumulation segments arranged on the carrier opposite the moving blades and adjacent to the guide vanes;
   at least one sealing element arranged between the guide vanes and the heat accumulation segments; and
   a protective shield arranged between the at least one sealing element and the hot-gas duct, separating the at least one sealing element from the hot-gas duct.

2. The gas turbine arrangement as claimed in claim 1, wherein the rotor defines an radially outward direction and the at least one sealing element has a W-shape oriented in the rotor radially outward direction.

3. The gas turbine arrangement as claimed in claim 1, wherein the sealing element, the protective shield, or both, are segmented over the circumference.

4. The gas turbine arrangement as claimed in claim 3, wherein the sealing element, the protective shield, or both, comprises between four to eight segments.

5. The gas turbine arrangement as claimed in claim 1, wherein the heat accumulation segment comprises a step; and
   wherein the sealing element and the protective shield are arranged in or on the step of the heat accumulation segment.

6. The gas turbine arrangement as claimed in claim 5, wherein the protective shield has an L-shape.

7. The gas turbine arrangement as claimed in claim 6, wherein the protective shield is arranged horizontally on the step.

8. The gas turbine arrangement as claimed in claim 1, wherein the sealing element, the protective shield, or both, comprise a nickel- or cobalt-based superalloy.

9. The gas turbine arrangement as claimed in claim 1, further comprising:
   a metallic coating which coats the sealing element, the protective shield, or both.

* * * * *